(12) United States Patent
McCoy et al.

(10) Patent No.: US 7,886,226 B1
(45) Date of Patent: Feb. 8, 2011

(54) CONTENT BASED AD DISPLAY CONTROL

(75) Inventors: William H. McCoy, Baindbridge Island, WA (US); Richard Wright, Palo Alto, CA (US); Peter Sorotokin, Cupertino, CA (US)

(73) Assignee: Adobe Systems Incorporated, San Jose, CA (US)

( * ) Notice: Subject to any disclaimer, the term of this patent is extended or adjusted under 35 U.S.C. 154(b) by 890 days.

(21) Appl. No.: 11/739,525

(22) Filed: Apr. 24, 2007

Related U.S. Application Data (60) Provisional application No. 60/828,063, filed on Oct. 3, 2006, provisional application No. 60/862,583, filed on Oct. 23, 2006, provisional application No. 60/862,585, filed on Oct. 23, 2006.

(51) Int. Cl.
*G06F 17/00* (2006.01)

(52) U.S. Cl. .................................................. 715/273

(58) Field of Classification Search ................ 715/200, 715/209, 253, 243, 273
See application file for complete search history.

(56) References Cited

U.S. PATENT DOCUMENTS

| | | | |
|---|---|---|---|
| 5,764,241 A | 6/1998 | Elliott et al. | |
| 6,065,024 A | 5/2000 | Renshaw | |
| 6,343,310 B1 | 1/2002 | DeRienzo | |
| 6,518,976 B1 | 2/2003 | Curtis et al. | |
| 6,546,397 B1 | 4/2003 | Rempell | |
| 6,567,098 B1 | 5/2003 | D'Amora | |
| 6,687,745 B1 | 2/2004 | Franco et al. | |
| 7,124,093 B1 * | 10/2006 | Graham et al. ........... 705/14.41 |
| 7,174,506 B1 * | 2/2007 | Dunsmoir et al. .......... 715/207 |
| 7,346,606 B2 * | 3/2008 | Bharat .............................. 1/1 |
| 7,346,920 B2 | 3/2008 | Lamkin et al. | |
| 7,694,000 B2 * | 4/2010 | Flores et al. ............... 709/228 |
| 7,752,535 B2 * | 7/2010 | Satyavolu .................. 715/205 |
| 2002/0054138 A1 * | 5/2002 | Hennum ..................... 345/804 |
| 2002/0063727 A1 * | 5/2002 | Markel ....................... 345/661 |
| 2002/0078097 A1 * | 6/2002 | Chen et al. .................. 707/517 |
| 2002/0133565 A1 * | 9/2002 | Huat .......................... 709/218 |
| 2002/0154214 A1 | 10/2002 | Scallie et al. | |
| 2003/0018659 A1 * | 1/2003 | Fuks et al. .................. 707/500 |
| 2003/0061305 A1 | 3/2003 | Copley et al. | |
| 2004/0103207 A1 | 5/2004 | Elman et al. | |
| 2004/0260767 A1 * | 12/2004 | Kedem et al. ............... 709/203 |
| 2005/0071755 A1 * | 3/2005 | Harrington et al. .......... 715/511 |
| 2005/0076295 A1 * | 4/2005 | Simske et al. ............... 715/517 |

(Continued)

OTHER PUBLICATIONS

Ribeiro-Neto et al., Impedance Coupling in Content-target Advertising, ACM 2005, pp. 496-503.*

(Continued)

*Primary Examiner*—Cong-Lac Huynh
(74) *Attorney, Agent, or Firm*—Kilpatrick Stockton LLP (57) ABSTRACT

Methods, systems and program products for providing a first visual region, the first visual region configured to present content determined by a document. A distinct second visual region is provided, the second visual region not defined by the document and configured to present content that is not contained in the document. One or more attributes are identified in the electronic document. Based on the one or more attributes, the presentation of ad content in the second visual region is enabled or disabled. The electronic document is presented in the first visual region.

18 Claims, 8 Drawing Sheets

U.S. PATENT DOCUMENTS

| | | | | |
|---|---|---|---|---|
| 2005/0096980 | A1* | 5/2005 | Koningstein | 705/14 |
| 2005/0144065 | A1* | 6/2005 | Calabria et al. | 705/14 |
| 2005/0243346 | A1 | 11/2005 | Foehr et al. | |
| 2005/0248790 | A1 | 11/2005 | Ornstein et al. | |
| 2005/0275662 | A1* | 12/2005 | DiStefano | 345/619 |
| 2006/0004778 | A1 | 1/2006 | Lamkin et al. | |
| 2006/0020469 | A1 | 1/2006 | Rast | |
| 2006/0031419 | A1* | 2/2006 | Huat | 709/219 |
| 2006/0041638 | A1* | 2/2006 | Whittaker et al. | 709/219 |
| 2006/0122884 | A1* | 6/2006 | Graham et al. | 705/14 |
| 2006/0136553 | A1 | 6/2006 | Villaron et al. | |
| 2006/0146053 | A1 | 7/2006 | Gatewood et al. | |
| 2006/0236231 | A1* | 10/2006 | Allen et al. | 715/517 |
| 2006/0282314 | A1* | 12/2006 | Zamanian et al. | 705/14 |
| 2006/0282328 | A1* | 12/2006 | Gerace et al. | 705/14 |
| 2007/0078711 | A1* | 4/2007 | Anand | 705/14 |
| 2007/0100701 | A1 | 5/2007 | Boccon-Gibod et al. | |
| 2008/0040359 | A1 | 2/2008 | Arrouye et al. | |
| 2008/0041220 | A1 | 2/2008 | Foust et al. | |
| 2008/0082907 | A1* | 4/2008 | Sorotokin et al. | 715/210 |
| 2008/0082911 | A1 | 4/2008 | Sorotokin et al. | |

OTHER PUBLICATIONS

Olney et al, Consumer Responses to Advertising: The Effects of Ad Content, Emotions, and Attitude toward the Ad on Viewing Time, Google 1991, pp. 440-453.*

Maderlechner et al., Information Extraction from Document Images Using Attention Based Layout Segmentation, Google 1999, pp. 1-4.*

Song et al., Learning Important Models for Web Page Blocks based on Layout and Content Analysis, Google 2004 , pp. 1-10.*

Bayles, Designing Online Banner Advertisements: Should We Animate?, ACM 2002, pp. 363-366.*

International Preliminary Report on Patentability for PCT Application No. PCT/US2007/080122, dated Apr. 7, 2009, 5 pages.

International Preliminary Report on Patentability for PCT Application No. PCT/US2007/080336, dated Apr. 7, 2009, 8 pages.

"A browser sniffer/screen resolution sniffer that swaps stylesheets", The Designspace, [published Nov. 19, 2003] Retrieved on Dec. 5, 2008. Retrieved from the Internet: http://thedesignspace.net/MT2archives/000063.html.

PCT Notification Concerning Transmittal of International Preliminary Report on Patentability, dated Oct. 3, 2006, for International Application No. PCT/US2007/080122, 5 pages.

PCT Notification Concerning Transmittal of International Preliminary Report on Patentability, dated Oct. 3, 2006, for International Application No. PCT/US2007/080336, 8 pages.

Microsoft PressPass, "The New York Times to Enhance Online and Offline Reading Experience With Times Reader," available at http://www.microsoft.com/presspass/press/2006/apr06/04-28Times Re . . . , Copyright 2006 Microsoft Corporation, 3pp.

Ryan Stewart, "The Universal Desktop: The New York Times Reader—technically simply, conceptually spectacular," available at http://blogs.zdnet.com/Stewart/?p=98, Aug. 31, 2006, 3pp.

"Media Queries, W3C Candidate Recommendation Jul. 8, 2002," available at http://www.w3.org/TR/2002/CR-css3-mediaqueries-20020708/, Copyright 2002 W3C, 18pp.

DiRienzo, Andrew, letter of May 30, 2008, third-party submission regarding patent 6,343,310; 7 pages.

Adobe Systems Incorporated, "PDF Reference Manual, Fifth Edition" 2004, 1236 pages.

Hellsing, David; No More CSS Hacks; 2004; http://www.stylegala.com/articles/no_more_css hacks.htm; 2004; pp. 1-21, especially pp. 1-4.

Written Opinion of the International Searching Authority for PCT Application No. PCT/US07/80122, dated Oct. 10, 2008.

Written Opinion of the International Searching Authority for PCT Application No. PCT/US07/80336, dated Oct. 27, 2008.

* cited by examiner

```
220 ─┐  <adobe:page-template>

<fo:layout-master-set>
            <fo:simple-page-master master-name="m1" …>
                page-height="100%" page-width="100%">
                <fo:region-before extent="auto"      ◄
302 {              region-name="page-header"/>         ─ 310
                <fo:region-body column-count="2"
                    adobe:region-overlap="shrink"/>  ◄
            </fo:simple-page-master>                   ─ 312
         …
            <fo:page-sequence-master master-name="my-pg">
                <fo:repeatable-page-master-alternatives> ◄
                    <fo:conditional-page-master-reference  ─ 316
                        master-reference="m1"  ◄
                        adobe:condition="{xpath}"/> ─ 318
                                                       ─ 314
                    <fo:conditional-page-master-reference
304 {                   master-reference="m2"  ◄
                        adobe:condition="{xpath}"/>  ─ 320
                    …
                </fo:repeatable-page-master-alternatives>
            </fo:page-sequence-master>
         …
        </fo:layout-master-set>

326 ┐ <adobe:style>
306 {     ► <adobe:rule adobe:selector="{xpath}"       ┐
        330 ► adobe:condition="{xpath}"
                adobe:specificity="N"                    } 322
                property="value" …>
        328 ┐
          ► <adobe:rule adobe:selector="{xpath}"
        332 ► adobe:condition="{xpath}"
                adobe:specificity="N"                    } 324
                property="value" …>
            …
        </adobe:style>

<adobe:page-template>
```

CONTENT BASED AD DISPLAY CONTROL

CROSS-REFERENCE TO RELATED APPLICATIONS

This application claims priority to U.S. Patent Application No. 60/828,063, entitled ELECTRONIC PUBLISHING, to inventors William H. McCoy, et al., which was filed on Oct. 3, 2006. The disclosure of the above application is incorporated herein by reference in its entirety.

This application claims priority to U.S. Patent Application No. 60/862,583, entitled RENDERING EMBEDDED CONTENT, to inventors Richard Wright, et al., which was filed on Oct. 23, 2006. The disclosure of the above application is incorporated herein by reference in its entirety.

This application claims priority to U.S. Patent Application No. 60/862,585, entitled CONTENT BASED AD DISPLAY CONTROL, to inventors William McCoy, et al., which was filed on Oct. 23, 2006. The disclosure of the above application is incorporated herein by reference in its entirety.

BACKGROUND

The present disclosure relates to dynamic page layout.

Electronic content publishers would like their documents to be readable on a number of different display devices. However, software for displaying electronic documents typically does not take into consideration the effective target display window geometry and a default font size when laying out document content for presentation. For example, a document may always be displayed with three columns per page regardless of the size of the display. This can be unduly cumbersome for users of devices having small displays such as digital media players and mobile phones. For these devices, a single column would be desirable. Similarly, if a user's default font size is very large, three columns of text may also be undesirable.

SUMMARY

This specification describes technologies relating to environment-constrained dynamic page layout.

In general, one aspect of the subject matter described in this specification can be embodied in a method that includes providing a first visual region, the first visual region configured to present content determined by a document. A distinct second visual region is provided, the second visual region not defined by the document and configured to present content that is not contained in the document. One or more attributes are identified in the electronic document. Based on the one or more attributes, the presentation of ad content in the second visual region is enabled or disabled. The electronic document is presented in the first visual region. Other embodiments of this aspect include corresponding systems, apparatus, and computer program products.

These and other aspects can optionally include one or more of the following features. Ad content is presented in the second visual region if the ad content is enabled. The attributes can determine the location of ad content in the second visual region. The attributes can determine the source of ad content. Ad content is selected based on content in the electronic document. The ad content is static or dynamic, and can include images, text, sound, interactive content, or combinations of these. Additional information related to the ad content is presented in response to user selection of the ad content.

Particular aspects of the subject matter described in this specification can be implemented to realize one or more of the following advantages. Page masters and styling rules can be dynamically selected for one or more pages of a document based on display parameters of a target display window. Documents are made more readable and visually pleasing at different window sizes. It is possible to do what works best for each window size or display type. Advertisements can be dynamically presented or removed based on one or more attributes in a document's content.

The details of one or more aspects of the invention are set forth in the accompanying drawings and the description below. Other features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
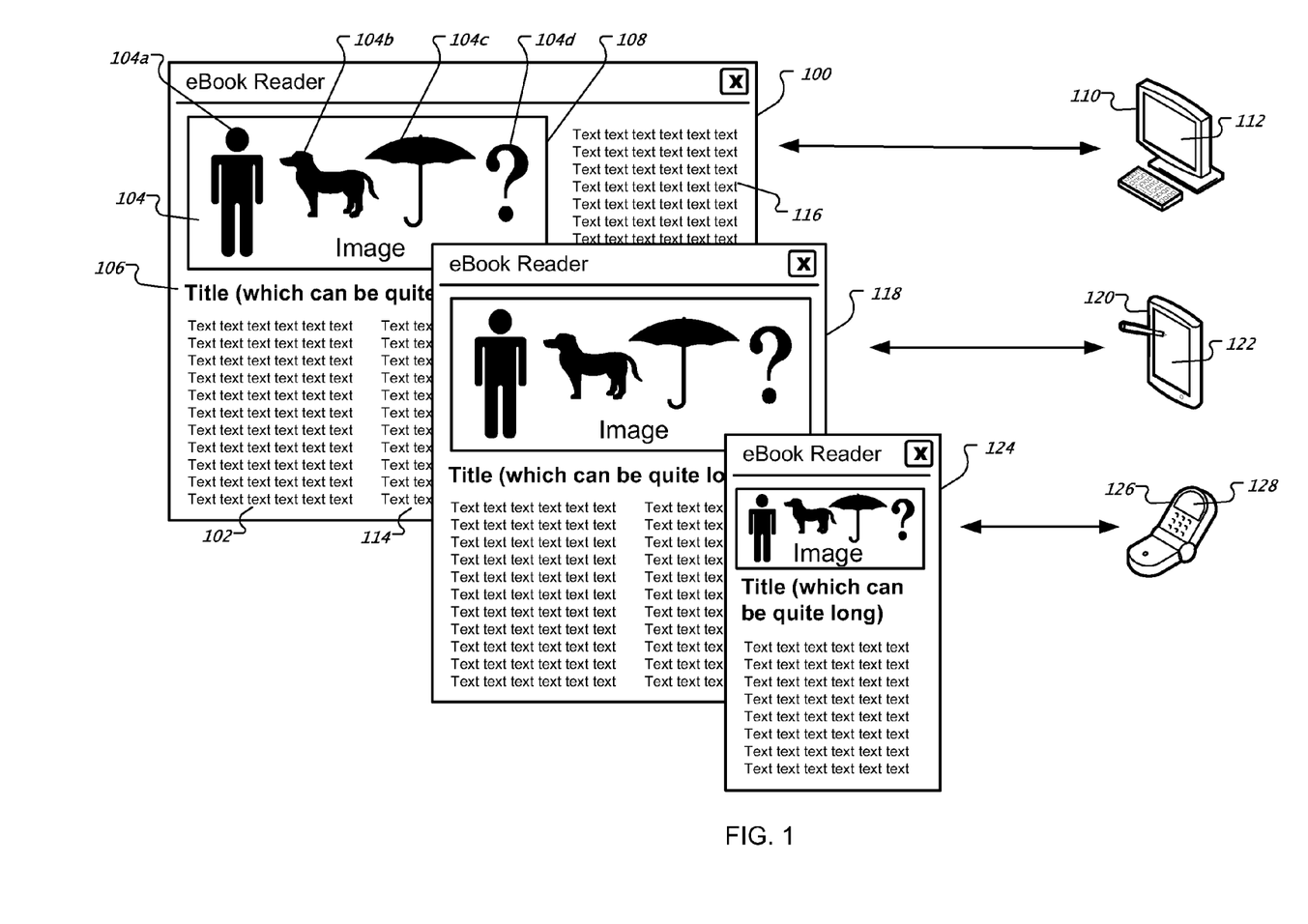
FIG. 1 illustrates the formatting of a document page based on display window parameters.

FIG. 1 illustrates the formatting of an electronic document page based on display window parameters. An electronic document (which for brevity will simply be referred to as a document) does not necessarily correspond to a file. A document may be stored in a portion of a file that holds other documents, in a single file dedicated to the document in question, or in multiple coordinated files. Moreover, a document may be provided in memory without first having been provided in a file. In various implementations, documents conform to the Open eBook Publication Structure (OEBPS) standard promulgated by the International Digital Publishing Forum (IDPS). However, other document formats are possible, such as Portal Document Format which is available from Adobe Systems Incorporated of San Jose, Calif.

Document pages can be presented on various display devices (e.g., 110, 112, 126). A document page (e.g., 100) contains content such as, for example, paragraphs of text (text column 102), images 104, a title 106, tables (not shown) and other items. Flow is a sequence of flowable content or "flow elements" (e.g., text column 102, images 104, tables, and other content) that can be included in a document. A region is an area of a document page (e.g., 100) where one or more flow elements "flow in". For example, in region 108 the images 104 "flow in" to the area of the page designated by a rectangular area. Layout is the process of formatting the flow(s). For example, a layout process can format the images 104a, 104b, 104c and 104d, to locate each image at a specific location within the region 108 and scale each to a size that fits within the region 108.

Documents can include flow elements having different content file types such as, for instance, Adobe Portable Document Format (PDF), Adobe Flash, HyperText Markup Language (HTML), Adobe ShockWave, or Scalable Vector Graphics (SVG). Other content file types are possible. Additionally, a flow element of a particular content file type can further contain nested (or embedded) flow elements having a different content file type. For example, a PDF flow element could contain an embedded Flash flow element, which in turn could contain a text document flow element.

Document pages can be formatted for a specific display device so that the content can be viewed comfortably given the constraints of the display device. Different page layouts for different combinations of display parameters make this possible. For example, if the width of a target display window can only accommodate fifty characters of text at a user's default font size, flow elements can be dynamically formatted to fit in the target display window. FIG. 1 illustrates the document page 100 formatted for three different display devices (110, 120, 126), each having different target display window parameters. Display parameters can include, for instance, a target display window height, a target display window width, a target display window resolution, a target display window color depth, a default font size, and a device type. Display parameters can include parameters obtained from a display device as well as parameters input by a user.

The personal computer display device 110 has a target display window 112 that is larger than the target display window 122 of the eBook reader display device 120. The display device 120's target display window 122 is larger than that of mobile phone display device 126. The document is formatted differently for each target display window based on the target display window's display parameters. For example, document page 100 which is formatted for presentation on target display window 112 has three columns of text (102, 114, 116), a large image area 104, and title 106 that fits on a single line. Whereas, document page 118, which is formatted for presentation on target display window 122, has only two columns of text. Document page 124 is formatted for the smallest target display window 128 in this example and, as such, only has a single column of text, a small picture area, and a title which is broken onto two lines. Although not shown in this example, font sizes and other styles can also be dynamically adjusted to accommodate display parameters.

Figure 2:
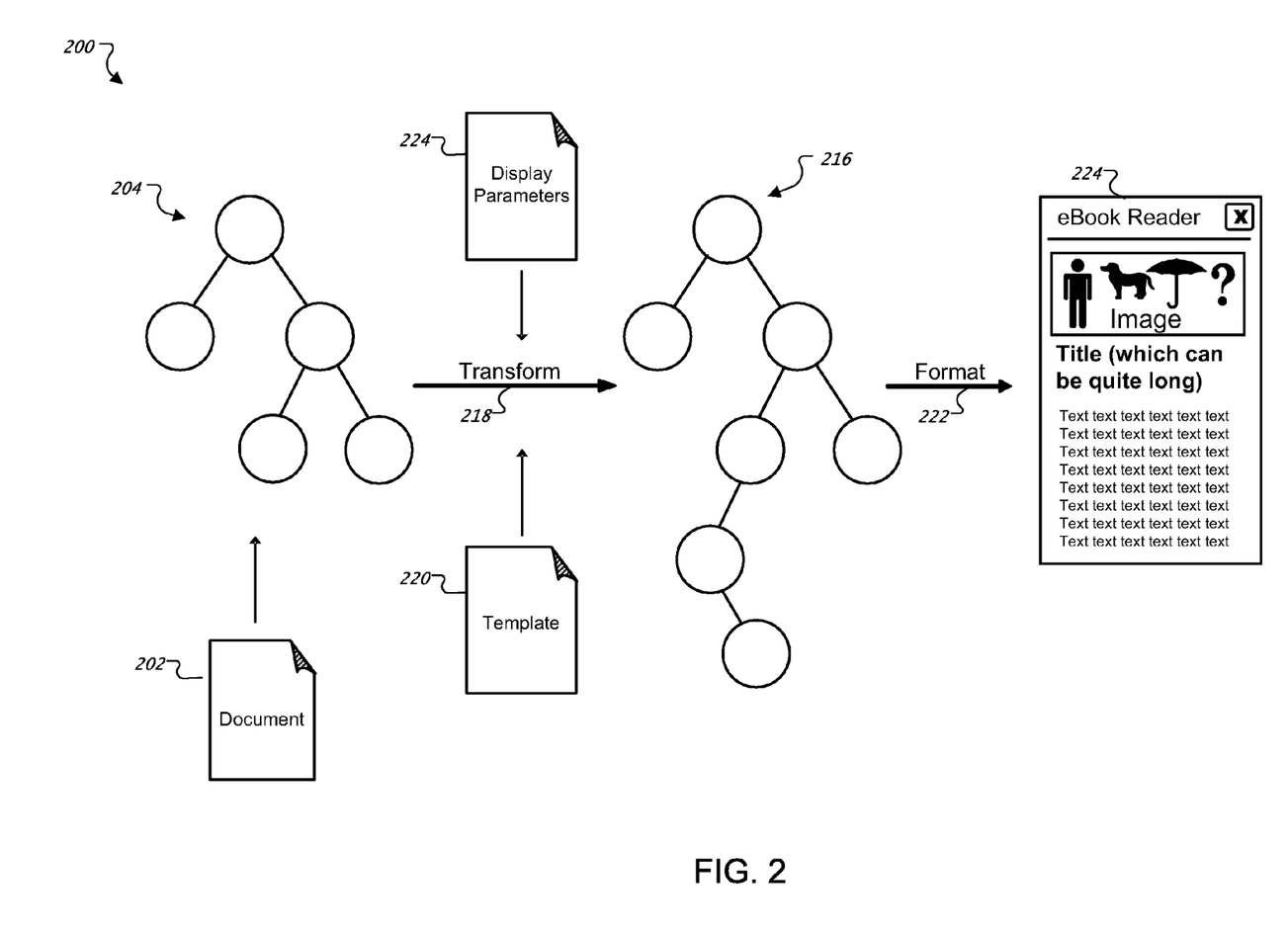
FIG. 2 illustrates a process for presenting a document on a target display window.

FIG. 2 illustrates a process 200 for presenting a document 202 on a target display window. The document 202 is parsed to create a source tree 204 data structure. In some implementations, the source tree is an eXtensible Markup Language (XML) tree. A result tree 216 can be constructed from the source tree 204 by a transformation process 218. In various implementations, an Extensible Stylesheet Language (XSL) stylesheet is used in the tree transformation. The XSL specification is available from the World Wide Web Consortium (W3C) in Cambridge, Mass. The stylesheet contains tree construction rules. Each rule has two parts: a pattern that is matched against elements in the source tree and a template that constructs a portion of the result tree.

The tree transformation 218 allows the structure of the result tree 216 to be significantly different from the structure of the source tree 204. In constructing the result tree 216, the source tree 204 can be filtered and reordered and arbitrary structure and generated content can be added. This allows content and structure to be transformed into any number of different formats. An example of generated content can be a table of contents that is added as a filtered selection of an original source document. In an example of arbitrary structure, the source data could be rearranged and sorted to form a table.

Information used by the transformation process 218 also includes display parameters 224 for a target display window and a template 220 (e.g, an XSL stylesheet) which indicates how the document 202 can be presented within the constraints of the display parameters 224. The template 220 is a combination of page masters, logic to select among them, and optionally, stylesheets, which will be described later in more detail. A formatting process 222 interprets the result tree 216 to create a formatted result 224 for the target display window. The process 200 can be used, for example, to generate document page 124 for display on display device 126, as described with reference to FIG. 1.

Figure 3:
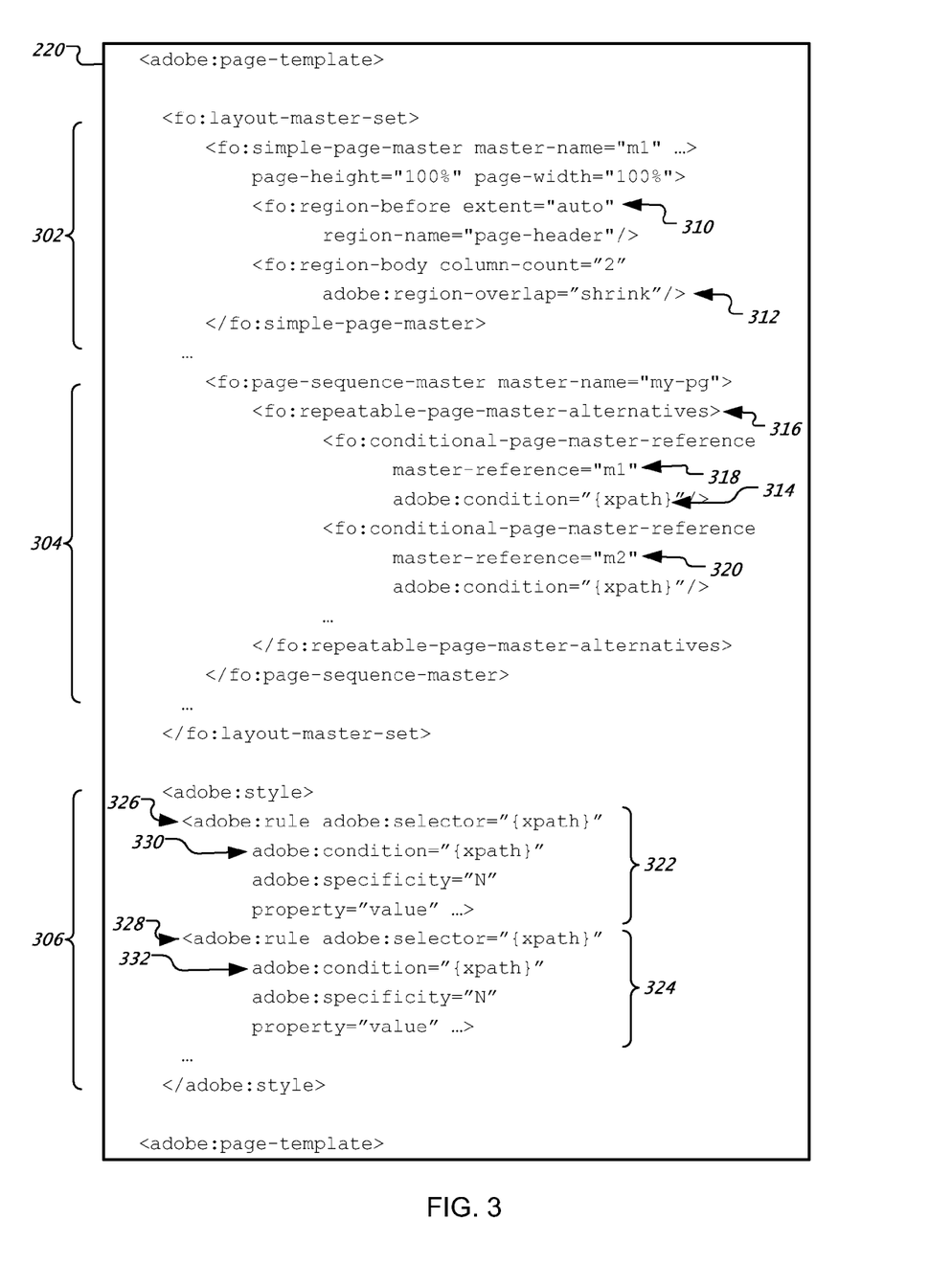
FIG. 3 is an example of a template as described with reference to FIG. 2.

FIG. 3 is an example of a template (e.g., 220) as described with reference to FIG. 2. The template 220 can include, for example, one or more simple page master definitions 302, a page master selection section 304, and a style selection section 306. Page masters define the surface partitioning of a page, such as the formatted page 118. In various implementations, page masters are specified as XSL-FO simple-page-master objects. XSL Formatting Objects (XSL-FO) are an XML vocabulary for specifying formatting semantics. The XSL-FO specification is also available from the W3C.

By way of illustration, a template can be assigned to flowable content in a stylesheet as follows:

body {
adobe-page-template: url(template.xml);
adobe-page-master: my-pg; /*optional*/
}

In some implementations, a template is used as a stylesheet. For example, the stylesheet can be referenced by eXtensible HyperText Markup Language (XHTML) through a link element:

<link rel="stylesheet" href="template.xml"/>

In this example, a page master named "m1" is defined in section 302. The "m1" page master defines a page master with a header region (region-before) and a two-column body region. The extent attribute value of "auto" 310 is an extension of the XSL-FO specification which allows a region, in this example a region named "page-header region", to grow and overlap another region. The adobe:region-overlap attribute 312 controls overlap resolution with preceding page regions. In this example, attribute 312 controls the overlap of the body region with the page-header region. Possible values for attribute 312 are: "ignore" which is the default value for XSL-FO compatibility, "shrink" region dimensions to use to avoid overlap (e.g., shrink the body region to avoid overlap with the page-header region), and "exclude" overlapped regions from the flowable region, like a float (e.g., float the overlapped body region above the page-header region. This can cause some content of the page-header region not to be displayed.).

Page master region dimensions and other values in the template 220 can be specified as XPath expressions (e.g., 314) that depend on display parameters. (XPath stands for XML Path Language which is an expression language used to access or refer to parts of an XML document.) Other expression languages are possible. The conditions for page master selection, for instance, can include whether the page is or is not first (a standard XSL-FO condition), and the minimal required page width for a target display window (an extension to XSL-FO). General expression-based conditions can also be specified. In various implementations, a special set of XPath conditions are defined which can access display parameters (see TABLE 1).

TABLE 1

| XPath FUNCTION | DEFINITION |
|---|---|
| adobe:page-width( ) | Width in CSS pixels. |
| adobe:page-height( ) | Height in CSS pixels. |
| adobe:page-aspect( ) | Page width/height. |
| adobe:page-number( ) | Current page number. |
| adobe:default-font-size( ) | Default font size in CSS pixels. |
| adobe:flow-document( ) | Returns the root of the document being flowed. |
| adobe:device-is-color( ) | True if device supports color. |
| adobe:resolution( ) | CSS pixels per inch. |

The page master selection section 304 can include a sequence of page masters, one of which will be conditionally selected to partition each document page by evaluating an XPath expression based on display parameters for a target display window. The repeatable-page-master-alternatives flow object 316 designates a sequence of page masters (e.g., master-reference 318 and master-reference 320) where a page master for each subsequent page is selected from the list based on selection conditions (e.g., 314). The first satisfactory page master encountered in the sequence is used (i.e., where the selection condition is met). This allows the page master definition most appropriate for a given target display window to be used to format a document page.

The style selection section 306 can dynamically apply styling rules to a document based on XPath expressions (or other expressions) that involve display parameters. Each styling-rule element (e.g., elements 322 and 324) can include a selector (e.g., selector 326 and selector 328 respectively), which can be expressed using the Cascading Style Sheets (CSS) selector syntax. Cascading Style Sheets (CSS) is a stylesheet language used to describe the presentation of a document written in a markup language. The CSS specification is maintained by the W3C. Styling rules can be used to define colors, fonts, layout, and/or other aspects of document presentation. CSS is designed primarily to enable the separation of document content (written in HTML or a similar markup language) from document presentation (written in CSS). The selector 326 can be predicated upon a dynamic condition, (e.g., adobe: condition 330), where the styling rule is only applied if the associated condition is true. In a similar manner, selector 328 can be predicated upon dynamically evaluated condition 332.

Figure 4:
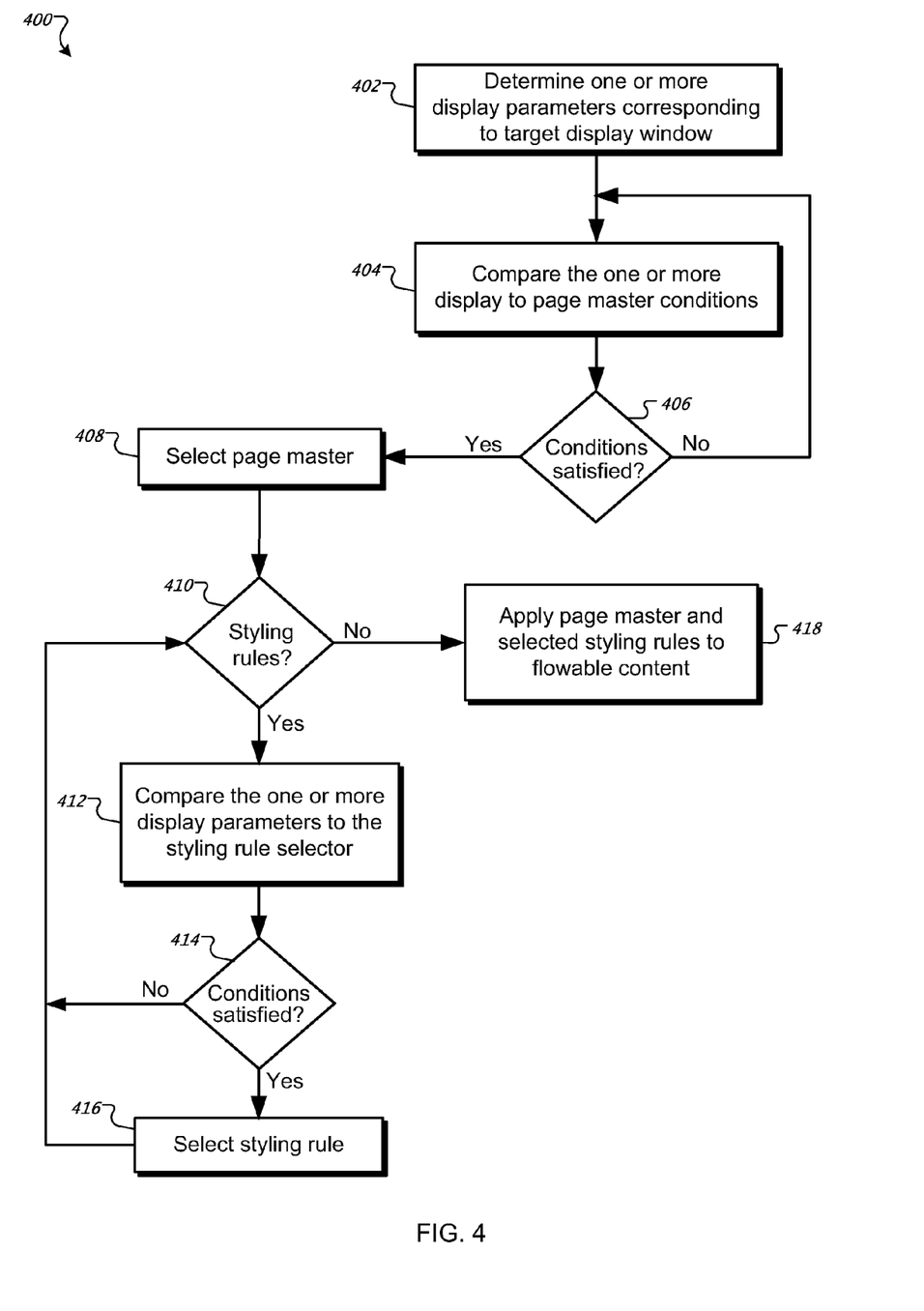
FIG. 4 is a flow chart of a method for dynamically selecting a page master and a styling rule based on display parameters.

FIG. 4 is a flowchart of a method 400 for dynamically selecting a page master and, optionally, a styling rule based on display parameters as part of processing a template. The method 400 begins by determining one or more display parameters corresponding to a target display window (step 402). Display parameters (e.g., 224) are then compared to page master conditions (step 404). Next, it is determined if the conditions for a specific page master are satisfied (step 406). If so, the corresponding page master is selected (step 408). If not, the next page master is considered for the comparison (step 404).

Next, it is determined whether the template contains styling rules (step 410). If not, the selected page master is applied to the flowable content (step 418). Otherwise, one or more display parameters are compared to a styling rule selector (step 412). If the styling rule selector condition(s) are satisfied (step 414), the styling rule is selected (step 416) and it is determined if there are additional styling rules to consider (step 410). If the styling rule selector condition(s) are not satisfied (step 414), it is also determined if there are additional styling rules to consider (step 410). If there are no more styling rules to consider (step 410), the selected page master and styling rules (if any) are applied to the flowable content (step 418).

Figure 5:
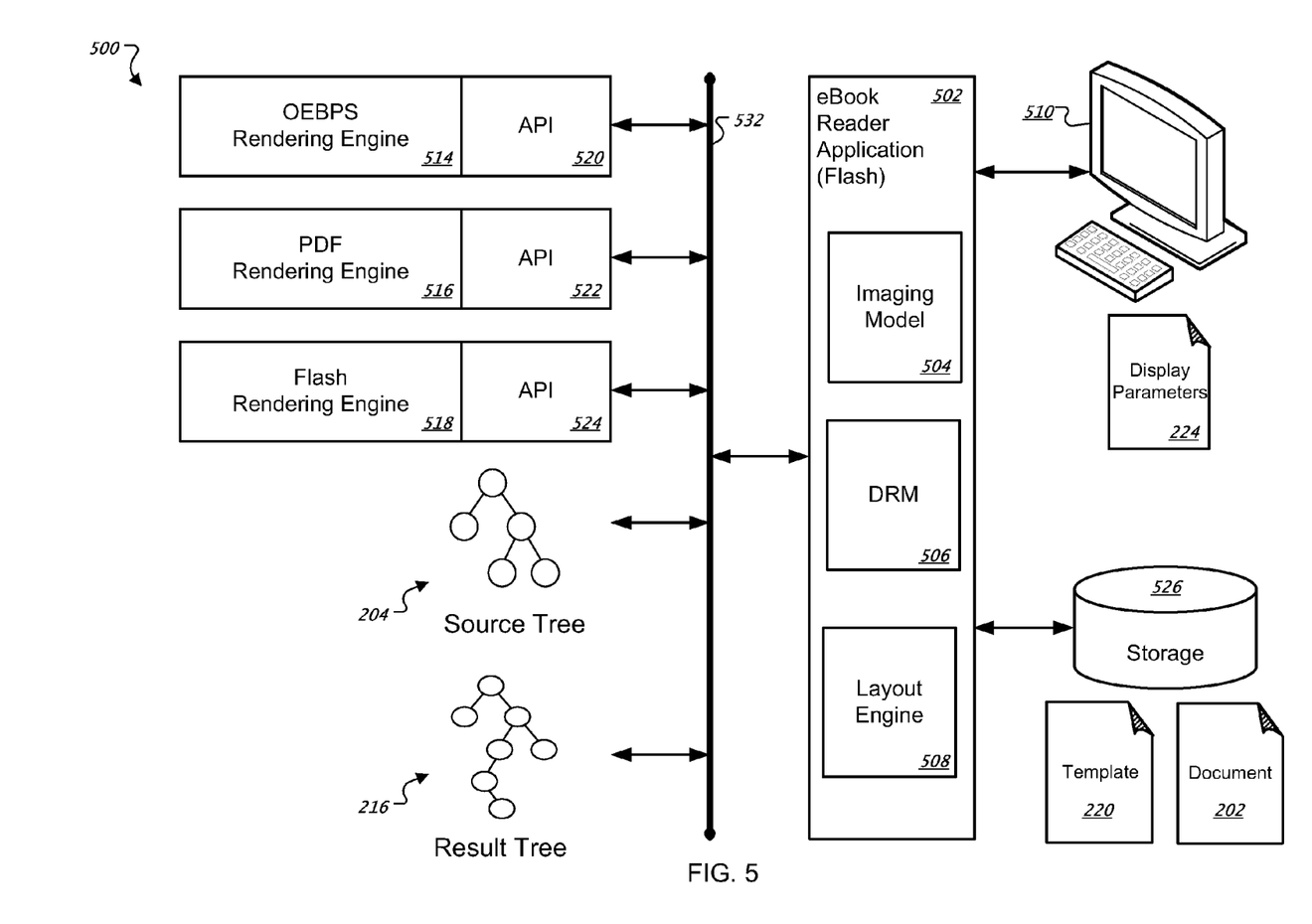
FIG. 5 illustrates a system for rendering documents.

FIG. 5 illustrates a system 500 for rendering documents based on display parameters. The system 500 includes an application 502. In various implementations, the application 502 is a Flash-based application. The application 502 can invoke one or more rendering engines to render documents (e.g., 202) on one or more display devices 510. The documents processed by the application 502 can be obtained from storage 526, which can be local storage, remote storage, or some combination of local and remote storage available over one or more networks. For example, the application 502 can render documents obtained over the Internet or streamed from one or more computers. A template 220 is used to format pages of the document 202 for presentation on display device 510.

The application 502 includes a layout engine 508 for creating a source tree 204 representation of the document 202, and for converting the source tree representation 204 to a result tree 216 using the template 220 and the display parameters 224, as described above. During the rendering of a document, the application 502 can invoke various rendering engines (514, 516, 518) by way of corresponding APIs (520, 522, 524), which each rendering engine exposes. An API constitutes a protocol for exchanging information between two software components and can be implemented as one or more function or method invocations, signals, variables, or combinations of these. For example, the application 502 can invoke an OEBPS rendering engine 514 through the API 520 to initially begin rendering an electronic document that has a top-level content file type of OEBPS. When the OEBPS rendering engine 514 encounters embedded content, the OEBPS rendering engine 514 can invoke another rendering engine (or itself since rendering engines are reentrant) to render the embedded content.

The APIs 520, 522 and 524 serve at least two purposes. First, each of the APIs 520, 522 and 524 can facilitate its corresponding rendering engine's communication with other rendering engines. This functionality allows, for example, the PDF rendering engine 516 to invoke whichever rendering engine is needed to process embedded content encountered by the engine 516. Second, the APIs 520, 522 and 524 can facilitate the receipt and execution of invocation requests received from other rendering engines. For example, the Flash API 524 can serve as the interface by which the Flash rendering engine 518 is initiated to render Flash content.

A representation of a transparent imaging model 504 can be provided to each invoked rendering engine by way of the API or other suitable means, beginning with the first rendering engine invoked for a given document. The imaging model 504 allows rendering engines to create transparent images (as well as opaque) that can be composited to form a rendered page of a document. The imaging model 504 represents transformations (e.g., scaling, rotation, or any other affine transformations), clipping with arbitrary paths, masking, opacity (including group opacity), blending modes, including blending of the elements of the embedded content with the environment, isolated and non-isolated groups, knock-out groups (e.g., if rendering engines support shape channels), and other suitable properties for a page of a document.

In various implementations, when a renderer encounters embedded content, the renderer can determine the following parameters:

A pixel-based bounding box of a page area that needs to be rendered.

A background in a bitmap surface that covers the page area that has to be rendered Current transformation matrix (e.g., transformation from the embedded content coordinate system to the pixel grid) for the page.

Embedded content's clip path, opacity and mask.

Embedded content's blending mode.

The parameters described above can be provided from one rendering engine to another by way of the API. In some implementations, rendering occurs on a surface which is aligned with a pixel grid. Rederers can apply the current transformation matrix to position the embedded content correctly with respect to the rendering surface before rendering, for example. The current transformation matrix can include, for example, scale, rotations and other non-pixel-friendly transformations and can be applied before rendering. The rendering engine can render on top of the existing content. The content of an embedded content's background can be readily calculated. In some implementations, the result that is expected from rendering embedded content is the image (pixels) of the background with the (portion of) embedded content rendered on top.

Renderers can render on top of existing content. Bitmap surfaces that renderers operate on can support a transparency channel and shape channel if knock-out groups are needed. In a knockout group, each individual element is composited with the group's initial backdrop rather than with the stack of preceding elements in the group. When objects have binary shapes (1.0 for inside, 0.0 for outside), each object overwrites (knocks out) the effects of any earlier elements it overlaps within the same group. At any given point, only the topmost object enclosing the point contributes to the result color and opacity of the group as a whole.

In the most general case, a renderer can use another renderer to paint the portion of embedded content twice: once on the transparent background and second time on the actual background. However, in a number of cases only single rendering may be required. If embedded content is rendered into the non-isolated group with normal blending mode, the content can simply be rendered in the group current backdrop. Opacity, masking and clipping can be done by rendering embedded content into a copy of the backdrop and then interpolating between the result and the original backdrop. If embedded content is rendered as an isolated group, the embedded content simply can be rendered into the clear transparent background.

The application 502 can also include a digital rights management (DRM) module 506 for use in controlling access to digital data (e.g., copyrighted images, music, videos, software, etc.) For example, the DRM module 506 can contain information regarding how individual digital data can be accessed, displayed or used. Also, some of this information can be passed to and among the various rendering engines 514, 516 and 518 as they are invoked and invoke each other to render embedded content corresponding to various content file types. The APIs 520, 522 and 524 can also include functionality for receiving and sending DRM data.

Figure 6:
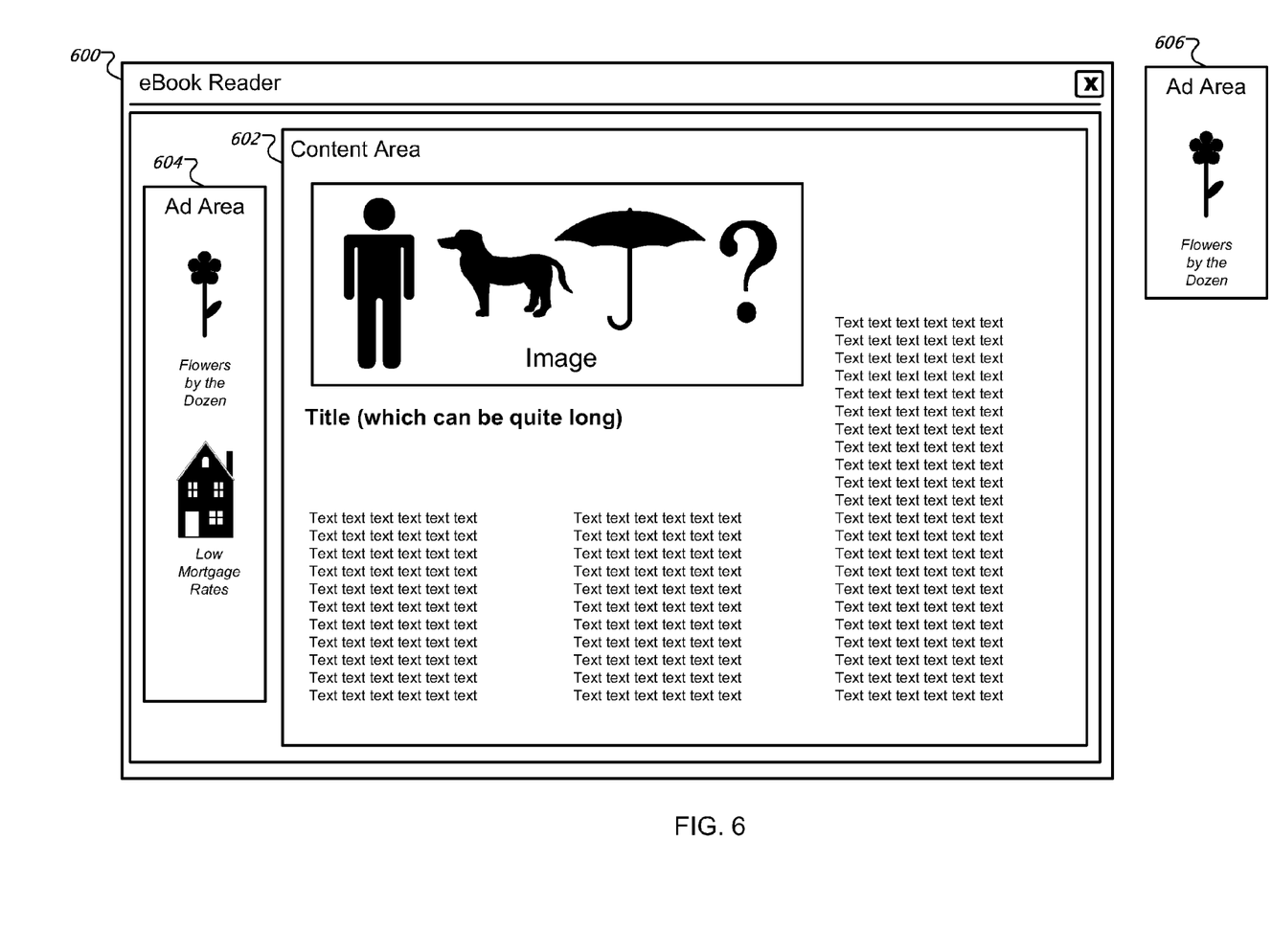
FIG. 6 illustrates a user interface for presenting documents.

FIG. 6 illustrates a user interface 600 for presenting documents. The user interface 600 includes a content area 602 and an optional ad area 604. The content area 602 presents one or more rendered document pages. The ad area 604 can optionally present one or more advertisements (or "ads"). There can be more than one ad area 604 and an ad area can be positioned anywhere in the user interface 600 outside of the content area 602. In some implementations, the ad area can be outside of the user interface 600, such as a floating window or "popup" ad area 606.

An ad can be static or dynamic, and can include images, text, sound, interactive content (e.g., Flash), or combinations of these. Selection of an ad by a user (e.g., by clicking on the ad with a mouse), can cause a browser window, or content area 602, to present additional information related to the ad such as the ad sponsor's website. In various implementations, ads can be determined based on aspects of content displayed in the content area 602. For example, words or images in the content can be used to select a relevant ad. Ads can be provided, for instance, by a content provider, an application publisher, or a third party hosting service.

In various implementations, one or more attributes or flags in the content can turn ads on or off. Turning ads on causes ads to be displayed in one or more ad areas (e.g., 604 or 606) whereas turning ads off causes ads to be removed from one or more ad areas, if there are any ads displayed in the first place. Publishers of premium content may wish to turn ads off, for example. Additional attributes or flags can determine the position of ad areas and where ad content should be obtained. In various implementations, ad attributes can be specified as metadata (e.g., an XML element) in the document to distinguish the attributes from flowable content. However, other ways of specifying attributes in document content are possible.

Figure 7:
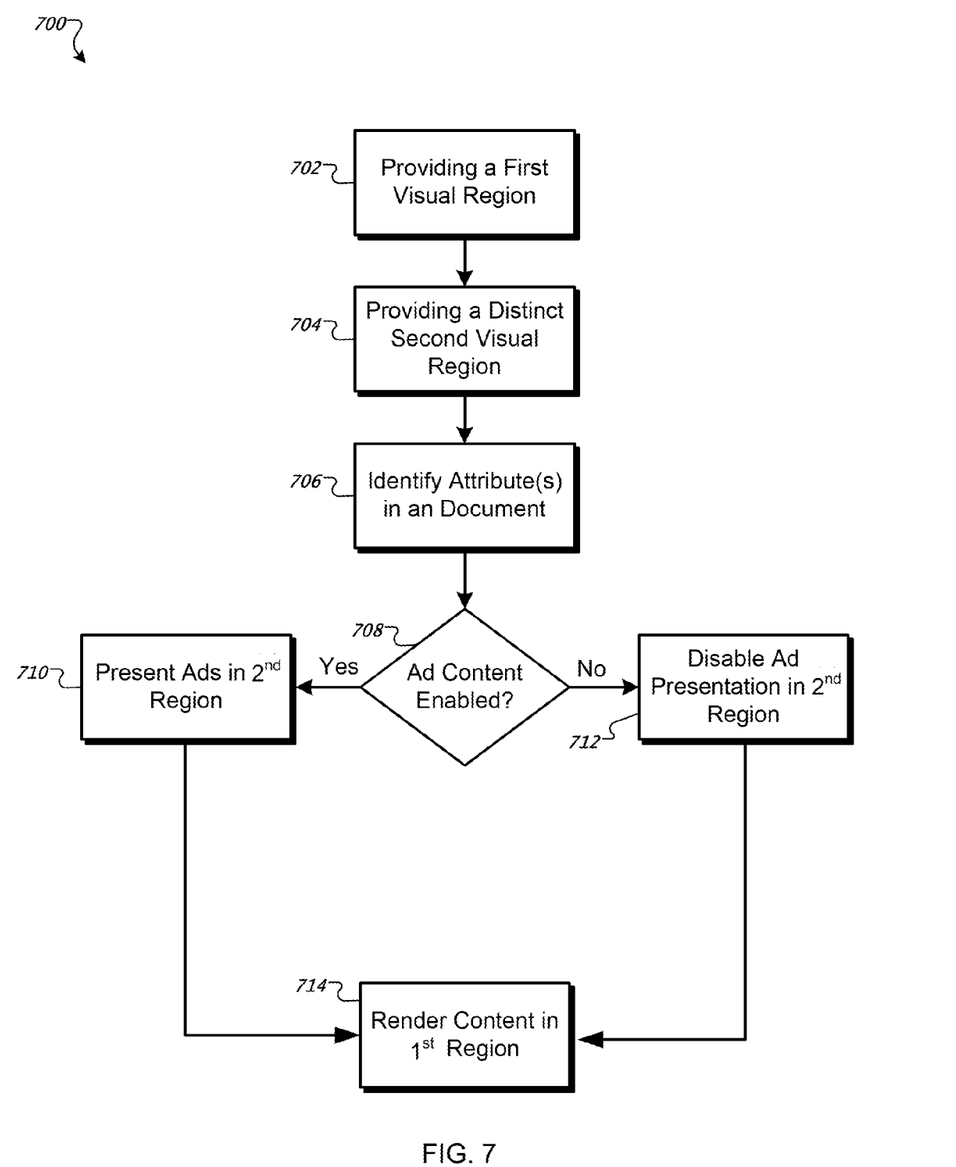
FIG. 7 illustrates a flowchart of a method for turning ads on or off.

FIG. 7 illustrates a flowchart of a method 700 for turning ads on or off. Method 700 begins by providing a first visual region (e.g., 602; step 702) for the document. For example, an application program can create a visual region on a display device by providing a programmatic description of the region to a software entity such as by way of a graphical user interface API that can render the region. Next, a distinct second visual region is provided (e.g., 604; step 704). Attributes are identified in the document (step 706), such as by traversing a source tree representation of the document. It is then determined whether an attribute enables ad content (step 708). If so, one or more ads are presented in the second visual region (step 710). Otherwise, any ads currently presented in the ad area (e.g., 604 or 606) are removed from the ad area. Then the content for the first visual region is rendered (step 714).

Figure 8:
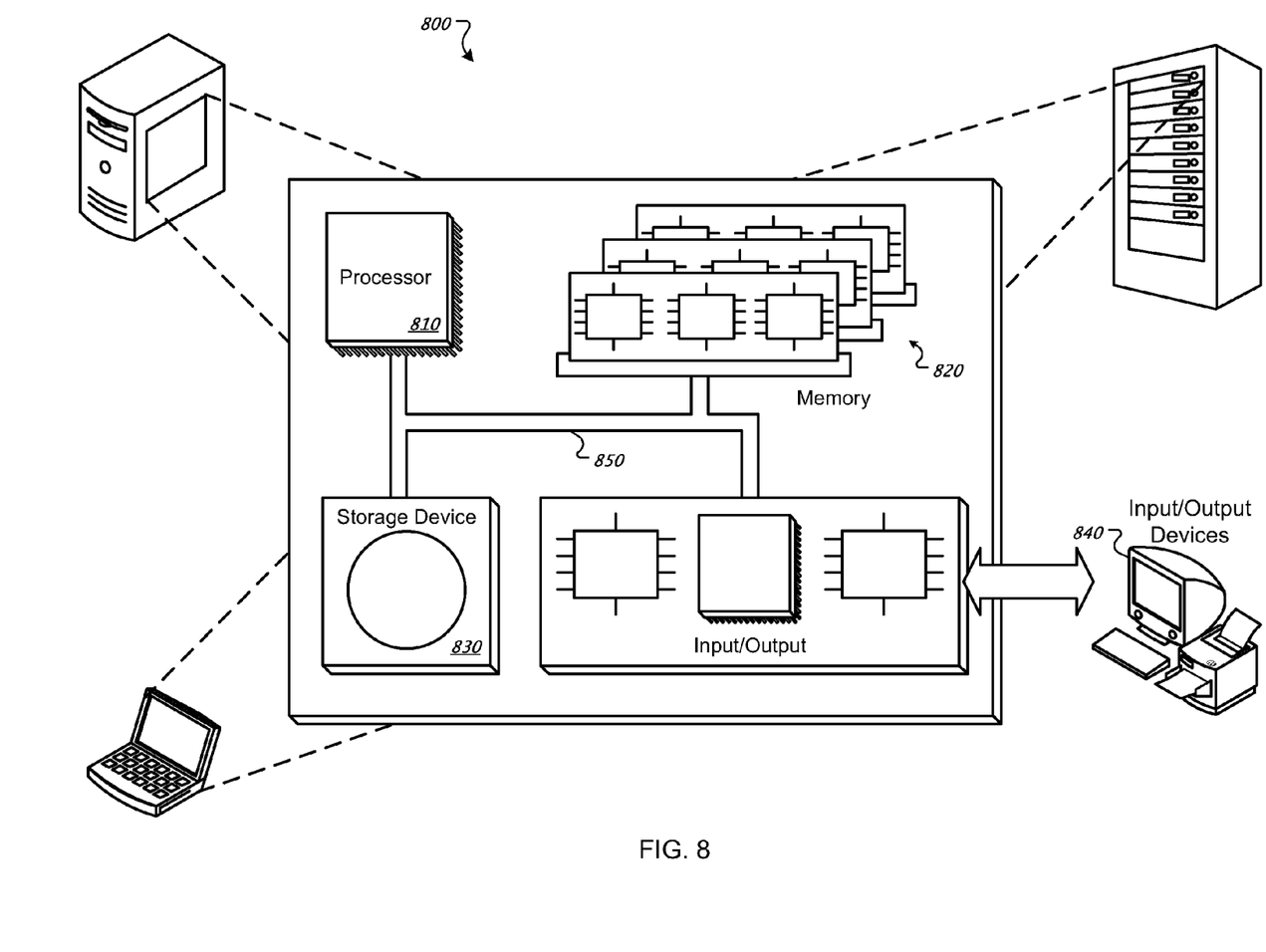
FIG. 8 illustrates a document rendering system.

FIG. 8 illustrates a system 800 for rendering a document. The system 800 includes a processor 810, a memory 820, a storage device 830, and an input/output device 840. Each of the components 810, 820, 830, and 840 are interconnected using a system bus 850. The processor 810 is capable of processing instructions for execution within the system 800. For example, the processor 810 can be a microcontroller that executes instructions that carry out the methods 400 and 700. In some implementations, the processor 810 is a single-threaded processor. In other implementations, the processor 810 is a multi-threaded or multi-core processor. The processor 810 is capable of processing instructions stored in the memory 820 or on the storage device 830. In some implementations, the processed instructions may generate graphical information for a user interface, on the input/output device 840. For example, the processor 810, can be a microcontroller than can run application 502.

The memory 820, which is a computer-readable medium, stores information within the system 800. In some implementations, the memory 820 is a volatile memory unit. In other implementations, the memory 820 is a non-volatile memory unit. For example, the memory 820 can store source tree 204 and result tree 216 for processing by application 502.

The memory 820 may be suitable for tangibly embodying computer program instructions and data. The instructions and data can be loaded into memory from an external source, such as the storage device 830 or the input/output device 840. For example, the memory 820 can load application 502 from storage device 830.

The storage device 830 is capable of providing mass storage for the system 800. In some implementations, the storage device 830 is a computer-readable medium. In various different implementations, the storage device 830 may be a floppy disk device, a hard disk device, an optical disk device, or a tape device. For example, the storage device 830 can store template 220, document 202 and display parameters 224.

The input/output device 840 provides input/output operations for the system 800. In some implementations, the input/output device 840 includes a keyboard and/or pointing device. In other implementations, the input/output device 840 includes a display unit for displaying graphical user interfaces. Display device 510 is an example of an input/output device 840.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a memory device, a composition of matter effecting a machine-readable propagated signal, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. For example, the actions recited in the claims can be performed in a different order and still achieve desirable results.

What is claimed is:

1. A computer-implemented method, comprising:
   providing a first visual region, the first visual region configured to present content determined by a document;
   providing a distinct second visual region, the second visual region not defined by the document and configured to present content that is not contained in the document;
   identifying one or more attributes in the electronic document, wherein identifying the one or more attributes comprises identifying an attribute that controls ad presentation and identifying a value for the attribute that controls ad presentation;
   based on the value of the attribute that controls ad presentation, enabling or disabling the presentation of ad content in the second visual region;
   presenting the electronic document in the first visual region; and
   presenting ad content in the second visual region, the ad content presented only if the value of the attribute that controls ad presentation indicates that that presentation of ad content is enabled.

2. The method of claim 1 where:
   the attributes determine a location of ad content in the second visual region.

3. The method of claim 1 where:
   the attributes determine the source of ad content.

4. The method of claim 1, further comprising:
   selecting ad content based on content in the electronic document.

5. The method of claim 1 where:
   the ad content is static or dynamic, and can include images, text, sound, interactive content, or combinations of these.

6. The method of claim 1, further comprising:
   presenting additional information related to the ad content in response to user selection of the ad content.

7. A system comprising:
   a display for presenting a document;
   one or more control interfaces configured to receive input from a user; and
   processor electronics configured to perform operations comprising:
      providing a first visual region, the first visual region configured to present content determined by a document;
      providing a distinct second visual region, the second visual region not defined by the document and configured to present content that is not contained in the document;
      identifying one or more attributes in the electronic document, including identifying an attribute that enables or disables ad presentation and a value of the attribute that enables or disables ad presentation;
      presenting the electronic document in the first visual region; and
      if the value of the attribute that enables or disables ad presentation indicates that ad presentation is enabled:
   presenting ad content in the second visual region, wherein the ad content is not presented if the value of the attribute indicates that presentation of ad content is disabled.

8. The system of claim 7 where:
   the attributes determine a location of ad content in the second visual region.

9. The system of claim 7 where:
   the attributes determine the source of ad content.

10. The system of claim 7 where the processor electronics are further configured to perform operations comprising:
    selecting ad content based on content in the electronic document.

11. The system of claim 7 where:
    the ad content is static or dynamic, and can include images, text, sound, interactive content, or combinations of these.

12. The system of claim 7 where the processor electronics are further configured to perform operations comprising:
    presenting additional information related to the ad content in response to user selection of the ad content.

13. A computer program product, encoded on a non-transitory computer-readable medium, operable to cause data processing apparatus to perform operations comprising:
    providing a first visual region, the first visual region configured to present content determined by a document;
    providing a distinct second visual region, the second visual region not defined by the document and configured to present content that is not contained in the document;
    identifying one or more attributes in the electronic document;
    identifying that an attribute controls whether or not to present ad content;
    determining a value of the attribute that controls whether or not to present ad content;
    based on the value of the attribute that controls whether or not to present ad content, enabling or disabling the presentation of ad content in the second visual region; and
    if presentation of ad content is disabled:
    presenting the electronic document in the first visual region without presenting ad content;
    if presentation of ad content is enabled:
    presenting the electronic document in the first visual region and presenting ad content in the second visual region.

14. The program product of claim 13 where:
    the attributes determine a location of ad content in the second visual region.

15. The program product of claim 13 where:
    the attributes determine the source of ad content.

16. The program product of claim 13, further comprising:
    selecting ad content based on content in the electronic document.

17. The program product of claim 13 where:

the ad content is static or dynamic, and can include images, text, sound, interactive content, or combinations of these.

18. The program product of claim 13, further comprising: presenting additional information related to the ad content in response to user selection of the ad content.

* * * * *